United States Patent
Nestvall (12) 
(10) Patent No.: US 7,059,167 B2
(45) Date of Patent: Jun. 13, 2006

(54) METHOD AND ARRANGEMENT FOR INDIRECTLY DETERMINING FILL CHARACTERISTICS OF A FLUID TANK ON A MARINE VESSEL

(75) Inventor: Per Nestvall, Mölndal (SE)

(73) Assignee: AB Volvo Penta, Göteborg (SE)

( * ) Notice: Subject to any disclaimer, the term of this patent is extended or adjusted under 35 U.S.C. 154(b) by 0 days.

(21) Appl. No.: 10/248,615

(22) Filed: Jan. 31, 2003

(65) Prior Publication Data

US 2004/0149003 A1    Aug. 5, 2004

(51) Int. Cl.
*G01F 19/00* (2006.01)
*G01F 25/00* (2006.01)

(52) U.S. Cl. ........................................... 73/1.73
(58) Field of Classification Search ............. 73/1.73, 73/1.74, 149, 312, 290 R, 30, 290 B; 702/55, 702/100

See application file for complete search history.

(56) References Cited

U.S. PATENT DOCUMENTS

| 4,406,152 A | 9/1983 | Palmer et al. ............... 73/1.73 |
| 6,252,499 B1 | 6/2001 | Gerdtz et al. ............ 340/450.2 |
| 6,597,998 B1 * | 7/2003 | Gonring .................... 73/290 R |

FOREIGN PATENT DOCUMENTS

| DE | 3825630 A1 | 2/1990 |
| EP | 0595389 A1 | 5/1994 |
| FR | 2710743 A1 | 4/1995 |
| GB | 2009417 A | 6/1979 |

* cited by examiner

*Primary Examiner*—Charles Garber
*Assistant Examiner*—Tamiko Bellamy
(74) *Attorney, Agent, or Firm*—Novak Druce & Quigg, LLP (57) ABSTRACT

Method and arrangement for accommodating indirect ascertainment of fill-characteristics of fluid tanks on marine vessels. The invention includes providing an experientially-based mapping of volume characteristics of a fluid tank positioned on a marine vessel that are correlated with respect to measurable fluid surface positions within the fluid tank. In consideration of this volume characteristic mapping, fluid fill condition information is output for operator use based on quantification of a parameter other than sensed fluid level in the fluid tank. While it is contemplated that the other parameter may be any characteristic that readily reads back to the volume characteristic mapping, it is particularly advantageous, and a preferred embodiment of the invention, that the other parameter be a volumetric quantification of fluid consumed out of the tank that can be compared to an earlier ascertained tank volume.

37 Claims, 4 Drawing Sheets

METHOD AND ARRANGEMENT FOR INDIRECTLY DETERMINING FILL CHARACTERISTICS OF A FLUID TANK ON A MARINE VESSEL

BACKGROUND OF INVENTION

1. Technical Field

The present invention relates to methods and arrangements for indirectly determining the amount of fluid contained in a tank onboard a marine vessel; more particularly, the invention relates to ways of providing level readings of onboard carried fluids such as fuel and potable water to the operator of a marine vessel that are not effected by the operating conditions of the vessel at the time the reading is desired.

2. Background Information

A common malady that operators of marine vessels, and particularly sport craft, have traditionally had to endure is an inability to obtain accurate readings of fill conditions of fluid tanks carried on the vessel. The problem lies not only with fuel tanks, but also with other fluid carrying tanks such as those for potable water.

The inability to obtain sharp readings of carried fluids on a continuous basis depends on several characteristics that are often unique to marine vessels, and particularly to smaller sport-type boats. Among other characteristics, these types of sport boats often travel at high rates of speed, and because of their comparatively small size, are radically affected by the conditions of the water upon which the boat is traveling.

For those persons who have been passengers on such boats in rough water, the fact that fuel in the fuel tank is splashing about is easy to imagine. Similarly, sport boats are often used in activities requiring frequent speed changes and rapid accelerations, as well as decelerations. An exemplary activity that necessitates this type of operation is water skiing.

Still further, for those persons familiar with typical float-based fuel gauges that are traditionally used to measure remaining fuel amounts in a boat's tank, the likely inaccuracy of the readings obtained from the splashing about fuel during rough water travel is also clear.

Another unique characteristic of these types of sport boats is that the attitude; that is, the relative angle with respect to horizontal at which the boat is normally positioned is rarely constant, at least during travel. Moreover, the attitude of the boat is almost never the same under any travel conditions as to when the boat is at rest in the water.

The dynamic nature of fluids held in tanks onboard sport boats, especially when coupled with the fact that the boat is rarely oriented during travel as it is when at rest at best creates consternation for the operator who observes the fluctuations reported by some gauges. Worse, however, are the effects suffered by those operators that may be mislead into believing that supplies of certain fluids, such as fuel, are different, for example, more plentiful than that which actually remains in the observed tank.

Another complication to such fluid gauge readings is also frequently encountered on marine vessels. The complication stems from the character of certain fluid tanks that are employed on marine vessels, and particularly on sport boats. Flexible, bladder-style tanks are often utilized on these types of boats. One reason for their use is that the space within which they are accommodated is often of highly irregular shape, and therefore flexible tanks that can assume the shape of their environment are desirable. Still further, it is common for the accommodation spaces to vary from boat-to-boat, even within same makes and models. At least one reason for these variations is that the way the boat is outfitted with options and accessories often effects the accommodation space for the fluid tank. Therefore, actually flexible tanks may be utilized as described above, but construction techniques that facilitate easy adaptation (flexible) to varying receiving space requirements may also be employed, but that render substantially rigid-walled tanks for installation onto the boat.

Several detrimental effects are suffered because of the utilization of non-uniform tanks when accessorized with traditional float-based level gauges. One negative effect stems from the limitation that the boat manufacturer never knows an exact volume contained by a tank of this type, since by its nature, different carrying capacities are determined by the non-uniform space into which that tank is installed. The limitations of conventional float gauges prevents more utility than producing an indication of fullness based on relative position within the tank. Because of these limitations, the boat manufacturer can be at risk when specifying tank capacity to the consumer. Still further, there is no accommodation for allowing the end user to make such a specification after purchase, for instance, when the capacity is learned upon the first fill-up of the tank if fluid input is otherwise measured; for example, via a dispensing pump.

Another of marine onboard tanks malady is that the contained volume within the tank is rarely uniform with respect to any axis, and especially with respect to a vertical axis along which traditional float-based gauges act. This means that uniform movement of the float gauge can not report uniform changes in fuel level thereby introducing inaccuracies that can prove unacceptable, or at least cause users to seek out better systems. This can be especially important if buyers choose one boat over another because of the type of reporting they can expect with respect to the boat's fluid gauge reporting capabilities.

It should be appreciated that merely smoothing or filtering the fluctuations effecting the float of a conventionally designed gauge is not sufficient. The operational characteristics of marine vessels, and particularly that of sport boats which can cause extreme turbulence and the splashing about of fluids in onboard tanks undermines the benefits that can be expected in other less active environments. Still further, these characteristics prevent the application of most, if not substantially all solutions developed for other vehicular environments. This includes land vehicles and aircraft because these types of transports predominantly travel at reasonably constant rates of speed on relatively smooth courses, at least in comparison to sport water craft.

SUMMARY OF INVENTION

The present invention in its various forms provides both methods and arrangements for obviating the deficiencies defined hereinabove with respect to presently available systems for measuring and reporting fill conditions of fluid tanks on marine vessels.

In a most basic sense, one embodiment of the present invention provides both a method and an arrangement for ascertaining the amount of fluid remaining in a onboard tank of a marine vessel without the benefit of knowing any current conditions within the tank at the time of interest or inquiry. This capability is enabled through a collection of operational steps, and associated system components.

In one instance, the invention enables a mapping of the interior of an onboard fluid-fillable tank regarding the characteristic of volume as it relates to at least one other tank characteristic. The other characteristic should be independently quantifiable. In at least one of the exemplary embodiment of the invention that is described in greater detail hereinbelow, this other characteristic is the position in the tank of the top surface of the fluid of interest. A position reading will normally be taken at a substantially discrete point. It is contemplated that the top surface level may be sensed in a number of ways, including mechanically, such as by using a conventional float arrangement. The surface may also be detected in less traditional ways such as by using wave-based detectors. These wave-based detectors can include those operating within either the sound or optical waveband ranges.

Another aspect of the invention is that a predominance of the tank volume readings displayed to the boat operator are derived independently from any direct measure of the tank volume, including even from detection of the top surface of the fluid. In the illustrative case, the reading is made based on a volumetric measurement of fluid consumed out of the tank in comparison to an earlier known volume from within the tank. By example, at the time of interest, if a beginning volume in the tank is known to be twenty units, and five units have been measured as having been consumed therefrom, the calculated amount (reading) of fifteen units remaining in the tank can be communicated to the operator.

Another feature of the presently disclosed invention is that it is self-learning and refining. That is to say, historical data is maintained, and from this historical data the volumetric map of the fluid tank is continually refined thereby improving the quality of data that can be displayed to the operator regarding remaining fluid quantities during boat operation. This quality of the invention is defined herein as the characteristic of being an experientially-based mapping of volume.

In at least one embodiment, the present invention takes the form of a method for accommodating indirect ascertainment of fill-characteristics of fluid tanks on marine vessels. The method includes the steps of providing an experientially-based mapping of volume characteristics of a fluid tank positioned on a marine vessel that are correlated with respect to measurable fluid surface positions within the fluid tank. In consideration of this volume characteristic mapping, fluid fill condition information is output for operator use based on quantification of a parameter other than sensed fluid level in the fluid tank. While it is contemplated that the other parameter may be any characteristic that readily reads back to the volume characteristic mapping, it is particularly advantageous, and a preferred embodiment of the invention, that the other parameter be a volumetric quantification of fluid consumed out of the tank that can be compared to an earlier ascertained tank volume.

As intimated above, the accuracy of the output of fluid fill condition information is calibrated by occasional adjustment of the map of volume characteristics versus measured fluid surface position. Accuracy of the calibration process is assured by limiting performance of the calibrating step to when vessel conditions are amenable thereto. One example of such a condition is when the vessel is at a standstill. Another suitable condition would be after a suitable time period of substantially constant-speed travel had been maintained, and water conditions are such that fluid in the tank is resting substantially static therein. The accuracy of the readings from the system may also be enhanced by taking into account the attitude of the vessel. The attitude of the vessel may be utilized in a number of ways. One way is to include an effect corresponding to the degree of attitude, from a reference frame, such as at-rest flotation, in the volumetric assessment. Another is to use a quantification of the attitude of the vessel in determining whether or not amenable conditions exist for allowing execution of the calibration process.

In another aspect, the invention takes the form of a method for accommodating indirect ascertainment of fill-characteristics of fluid tanks on marine vessels that includes a step of mapping volume characteristics that have been obtained on an experiential basis of a fluid tank positioned on a marine vessel. A difference between this embodiment and that described hereinabove is that this embodiment requires the active mapping of the volume characteristics, while the previous embodiment can be provided with such a map. This provision may include active mapping as defined herein, but it may also include a map that is generated otherwise and then utilized during the execution of the previously described method.

It should be appreciated that this method for mapping the volume of onboard tanks can also be applied to multiple tanks that are either in actual fluid communication, one with the others, or that are fluidly separated. In the instance of separate tanks, the processor can be utilized to represent the several tanks as if they were one tank, at least for purposes of presenting data on fill-conditions of the tank to the boat operator. That is to say, two twenty gallon tanks can not only be advantageously mapped using the present invention, but further, those two tanks can be presented to the operator via the processor as one forty gallon tank. This gives the operator consolidated information about the total remaining amount of the fluid of interest.

Regarding this embodiment of the invention, the method can also further include correlating the volume characteristics versus sensable fluid surface level positions within the fuel tank, and in this way enabling corrective calibration of the output of fluid fill condition information to the operator. This step of corrective calibration of the output of fluid fill condition information can be caused to automatically occur at preselected intervals or based on operator initiation.

The experientially based mapping of volume characteristics of the fluid tank is based on a known fluid volume contained within the fluid tank and a correlating sensed fluid surface level position within the fuel tank. It is contemplated that the fluid surface level position within the fuel tank may be sensed utilizing a mechanically-based detector, or alternatively utilizing a wave-based detector. In the instance of a wave-based detector, it is contemplated that it may be optically or sound based depending upon the operational bandwidth of the sensor being considered.

In still another aspect, the invention takes the form of a calibrating liquid-level measurement arrangement for a marine vessel. The arrangement includes a liquid storage tank that is positioned on a marine vessel. A liquid surface position sensing device is arranged in communication with a processor and is adapted to provide position-indicating data regarding a sensed position of a liquid surface in the liquid storage tank to the processor. An operator input to the processor is provided that is adapted to accept quantitative information regarding liquid amounts added to the liquid storage tank. There is a liquid withdrawal arrangement that is in fluid communication with the liquid storage tank. This liquid withdrawal arrangement has a capability for measuring a volumetric amount of liquid withdrawn from the liquid storage tank via the liquid withdrawal arrangement. The processor is adapted to compare the sensed position of the liquid surface in the liquid storage tank with the measured volumetric amount withdrawn from the tank. In this way, correlation between an amount of liquid stored in the liquid storage tank and a corresponding sensed position by the liquid surface position sensing device is enabled.

In yet another aspect, the invention takes the form of a method for calibrating a liquid-level measurement arrangement for a marine vessel. The method includes a step of sensing an initial position of a liquid surface in a marine vessel's liquid storage tank that is at least partially filled with an amount of liquid. An amount of liquid withdrawn from the liquid storage tank is measured and a subsequent position of the liquid surface in the liquid storage tank is sensed thereby enabling an assignment of the volume of liquid stored in the liquid storage tank defined between the initial and subsequent positions. These sensing and measuring steps are repeated in series in a way that enables a mapping of stored liquid volume inside the liquid storage tank with respect to liquid top surface positions.

This embodiment includes utilizing, in a following sensing and measuring step, the subsequent sensed position as an initial sensed position of the liquid surface for enabling a substantially continuous mapping of stored liquid volume inside the liquid storage tank with respect to the axis.

A step of quantifying an amount of liquid added to a liquid storage tank positioned on a marine vessel may also be included, as well as correlating the quantified amount of liquid added to the liquid storage tank with a map-derived amount using sensed positions of the liquid surface in the liquid storage tank before and after the addition of the quantified amount of liquid. Another optional step includes correcting the map-derived amount to the quantified amount thereby calibrating the mapping of stored liquid volume inside the liquid storage tank with respect to the axis. Similarly, initializations of the mapping of stored liquid volume inside the liquid storage tank, with respect to the axis along which the liquid surface positions, are taken sensing an initial position corresponding to an essentially empty tank having substantially no liquid surface therein may be included; as well as filling, to a substantial extent, the liquid storage tank with a measured mount of liquid and sensing a subsequent position of the liquid surface in the substantially full liquid storage tank. In this manner, an assignment of a substantial total volume of the liquid storage tank is enabled that is defined between liquid surface positions corresponding to essentially empty and substantially full tank conditions.

Another optional step to this embodiment of the invention can include enabling accurate readings of tank contained volumes based on liquid surface position along the axis based on an historical data and calibrated mapping of tank volume with respect to axis position of sensed liquid surface position therealong.

This embodiment also enables the utilization of non-uniformly shaped tanks with respect to the axis along which the liquid surface positions are taken and/or non-matched liquid surface position sensors thereby increasing the universality of a pre-configured liquid storage tank arrangement positioned on a marine vessel. These non-rigid liquid storage tanks are influenced in shape, at least partially, by the environment in which the tanks are placed for operation.

The sensing of the liquid surface positions in the marine vessel's liquid storage tank is caused to preferentially be taken when the marine vessel has been traveling at a substantially constant speed for a predetermined period of time. In another aspect, the sensing of the liquid surface positions in the marine vessel's liquid storage tank is caused to only be taken when travel conditions of the marine vessel have satisfied a predetermined criteria which may include when the marine vessel is stopped, when a longitudinal axis of the marine vessel is off-set no more than a predetermined amount from horizontal, and/or when a longitudinal axis of the marine vessel is off-set no more than a predetermined amount from a static floating inclination of the marine vessel.

One particularly preferred embodiment of the invention configures the liquid storage tank as a fuel tank for a propulsion system of the vessel. It is contemplated that non-measured draws on the fuel tank may be permitted for consumption other than by propulsion systems of the vessel. An example would be burning fuel from the fuel tank for heating purposes; a fuel-use or consumption that is not normally measured. If this occurs, it is further contemplated that the invention will have the capabilities for blending out the effects of such consumption of non-measured draws on mapped tank volumes corresponding to liquid surface positions sensed along the axis.

It is also preferred that the invention have the capability of displaying a mapped amount of liquid remaining in the tank in a conventional manner so that confusion by an observing operator is avoided.

BRIEF DESCRIPTION OF DRAWINGS

In the following, the invention will be described in more detail and in a non-limiting way with reference to the accompanying drawings, in which.

DETAILED DESCRIPTION

As explained hereinabove, the presently disclosed invention(s) includes several different features and aspects which have been variously claimed for patent protection herein. General tenets of these several aspects have been described above; in that these basic aspects are believed to be new and novel, they are first broadly claimed, and then defined more narrowly where more specific details of the invention are recited. To this end, it should be appreciated that the specific embodiments of the invention that are described hereinbelow are intended only to provide examples of the claimed systems and methods. Moreover, the details of the inventive aspects that are described should not be ascribed to the claims unless expressly recited therein. Still further, as required, preferred embodiments that define the best modes for implementing the inventive aspects are found through the disclosed examples; but again, these examples only serve as illustrations of ways that the inventive features may be exploited.

Figure 1:
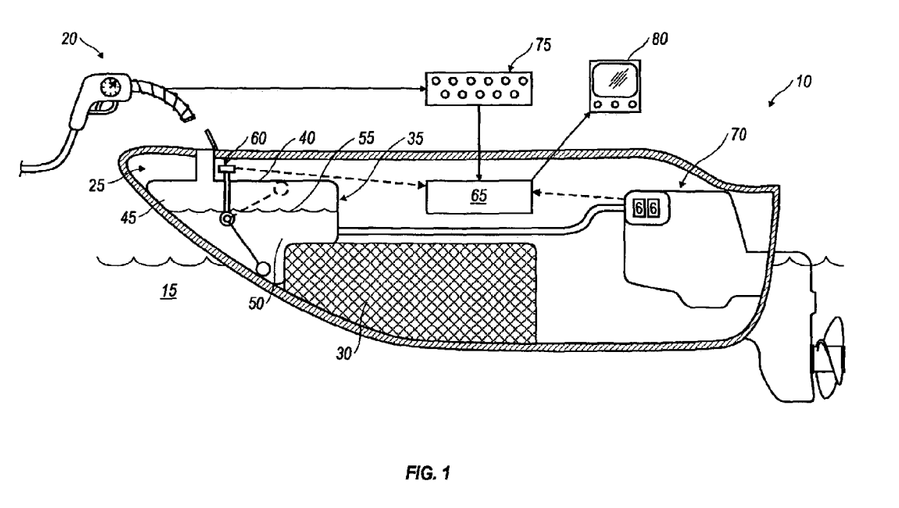
FIG. 1 is a schematic representation of an arrangement configured according to one embodiment of the present invention.

Initially, the several components of the arrangement will be described with respect to FIG. 1 wherein a marine vessel 10 is shown floating in a carrying body of water 15 such as a lake or ocean. The marine vessel 10 preferably takes the form of a sport boat designed to travel relatively fast in water conditions ranging from smooth to rough. In a particularly preferred embodiment, the vessel 10 takes the form of a ski boat that in use experiences many random and rapid accelerations and decelerations, with relatively short periods of substantially constant travel occurring therebetween.

The boat 10 forms a receiving space 25 for a fluid or liquid storage tank 35. Most frequently, this tank 35 holds either fuel or water. There may be more than one on-board tank, with each tank 35 holding a different contained fluid 50. In a similar manner, there may be multiple tanks included on a vessel, and each contains the same fluid. Configurations of this nature will be described in further detail hereinbelow with respect to FIG. 4.

In one embodiment, the tank 35 is formed by flexible walls 40 that are capable of being form-fitting to the environment in which the tank 35 lies. As described hereinabove, this accommodating feature allows the environments within which the tank 35 is used to be variable. This feature can be particularly important when the receiving space can optionally be compromised by an optional obstruction 30 projecting into the space. For instance, if an under-deck bow area of a sport boat 10 provides the receiving space, that area may also be variously utilized when optional equipment is specified by the operator. The flexible nature of tank 35 proves advantageous in that it optimizes tank capacity and avoids the need for customization or adaptation. Therefore, this type of flexible construction also permits the same tank to be utilized on a wide variety of boats, and does not require adaptation depending upon the receiving environment 25.

In an alternative, yet similar embodiment of the invention, instead of having walls that are themselves flexible, it is contemplated that flexible methods of constructing can be employed that permit easy adaptation for irregularly, or at least different configurations of the receiving spaces 25. These construction methods, however, render tanks 35 that are at least substantially rigid-walled, even though their shapes are irregular.

As a fuel tank 35, a capped inlet is provided that extends through the top-deck of the boat's 10 bow and is adapted to receive, in a conventional manner, the nozzle of a fuel dispenser 20. The fuel dispenser 20 is described as a volumetric measuring liquid dispenser because it includes the capability for measuring and reporting the amount of fuel 50 dispensed into the interior space 45 of the tank 35.

A means 60 for detecting a top surface 55 of the contained fuel 55 is included. Such a detector 60 may take the form of a mechanical float-type gauge as is illustrated in FIG. 1, but it may also take any other form suitable for making such a detection. Those persons skilled in these arts will readily appreciate that such a detection can be made using wavelength-based sensors such as those that use reflected sound or light waves. Similarly, other substitutes will be readily appreciated by those skilled persons. The detector preferably takes the surface reading at each particular level at substantially the same location time-after-time. In this way, the series of detected positions forms a continuum of points that establish an axis. Though an axis is normally thought of as being straight, the presently described axis may follow any course, but that course remains substantially unchanged with respect to tank-depth over the course of time. The detector 60 is in communication with an information processor 65.

The detector 60 supplies position readings, typically in the form of a measured distance from a reference point. In the instance of wave-based sensors, to the processor that reflects the position of the top surface 55 of the fuel in the tank 35 at the time of interest. The processor 65 may take any one of many possible forms. Those persons skilled in this art will readily appreciate similar computer-based processors that are utilized on-board marine vessels that are suitable for performing the prescribed tasks, and that are discussed in greater detail herein.

A liquid withdrawal arrangement 70 is fluidly connected to the tank 35. In the illustrated embodiment, the withdrawal arrangement 70 takes the form of the fuel delivery system 70 of the boat's 10 engines. Still further, the withdrawal arrangement 70 has the capability to meter and report that amount of fluid taken from the tank 35 back to the processor 65. This quantifying feature of spent fuel is common on computer-controlled, fuel injection systems and readily familiar to those persons skilled in this art. The utilization of the information, however, according to the teachings of the present invention is not known The processor is also optionally adapted to be placed in communication with both an operator information input device 75, and a display 80 for communicating information to the operator. The input 75 may take the form of a keyboard-style arrangement, but may also be substantially more simple since a highly desired capability of the input is to allow the operator to merely input the quantified amount of fuel 50 that has been dispensed into the tank 35. The display 80 may be as simple as an analog dial readout, or as complex as a display screen through which extensive information may be communicated.

As discussed hereinabove, the flexible wall type tanks 35 present a special problem because their configuration and capacity is not fixed until fully installed. Still further, the holding capacity may vary from one installation to the next thereby preventing manufacturer' specification of the tank capacities to the end user. Therefore, the present invention provides a way to indirectly ascertain the amount of fluid remaining in the tank. It should be appreciated that the present invention, in its several aspects, finds particularly advantageous utilization where such flexible tanks are concerned, but the same principles can be implemented on more rigid-wall tanks with the same efficacy. The importance of this fact is explored herein with respect to overcoming difficulties in ascertaining the amount of fuel remaining in a tank 35 when that fuel is active in the tank and a reliable top surface position of the fluid 50 is difficult to obtain.

In the case of tanks 35 that have irregular shapes, the volume is not normally going to be constant from top to bottom. Therefore, the implementation of conventional gauge technology is severely complicated, if not prohibited in these types of installations. As a result, the present invention relies on measuring the amount of fuel utilized and comparing that quantity against an ascertained tank capacity for determining amount of fuel remaining. This method and arrangement that does not depend on direct measurement of the fuel remaining in the tank, instead relies on a mapping of volumetric characteristics of the tank 35 and a direct measure of fuel consumed from the tank.

A principle of the invention is the development of a correlation map, table or function relating top-surface position of the contained fuel versus amount of fuel remaining in the tank 35. A first goal of the system is identifying tank capacity. Most simply, the operator input device 75 enables the amount of fuel added to the tank to be keyed into the system where it is recorded and considered by the processor 65. Therefore, in one embodiment of the present invention, it is contemplated that when fueled for the first time, the tank 35 will be filled completely and this amount will be input into the system thereby establishing the capacity of the tank 35. Knowing the capacity of the tank, computation of the amount remaining is a simple mathematical operation when the amount of fuel consumed is also known.

Difficulties can arise, however, when the tank is subsequently only partially filled. But even if there is a capability for resetting the system every time the tank is completely refilled thereby reestablishing the total available quantity, changes to the capacity of the tank can cause unacceptable inaccuracies in readings between full and empty conditions. Therefore, certain embodiments of the present invention provide the capability to continuously update and refine the map of the tank's 35 volume, and take readings of the remaining amount of fuel based on quantification of fuel consumption.

As described hereinabove, conditions in the fuel tank 35 of a marine vessel 10, such as a ski boat 35, will only intermittently exist during which reliable readings of the top surface of the remaining fuel can normally be taken. Therefore, there can be significant periods during which reliable readings of remaining fuel can not be directly ascertained. A solution of the present invention is to mark or map a position when conditions permit, and associate an amount of remaining (or consumed) fuel therewith. These pairings of top surface position and quantification of remaining amount of fuel are continued across the continuum extending from tank-full to tank-empty conditions. This pairing is recorded by, or for the processor for later access and use.

Figure 3:
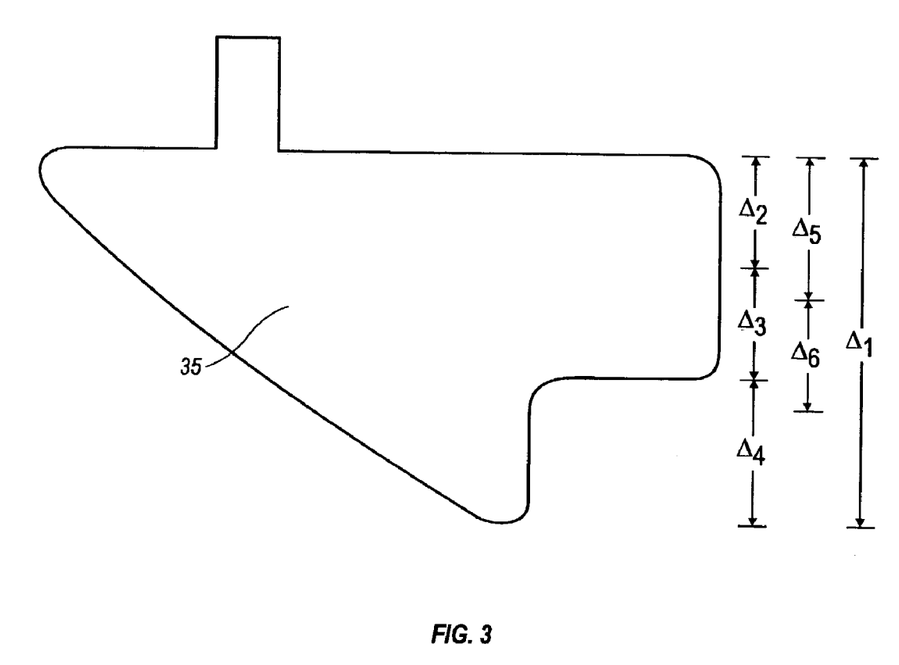
FIG. 3 shows six exemplary differential volumes that could be utilized in the mapping of the irregularly shaped tank located therebeside.

What happens in actuality, is that a series of such readings develops a plurality of marked positions with volumetric changes specified therebetween. Referring to FIG. 3, three exemplary series readings, from top (full condition) downward, are illustrated at the right of the representation of the tank 35. At the far right, only two conditions are mapped; tank-full and tank-empty, with the amount of fuel consumed indicated therebetween by $delta_1$. As a result, $delta_1$ corresponds to the tank capacity. In the left-hand example, four positions are mapped, with three changes in fuel quantities measured therebetween and represented by $delta_2$, $delta_3$ and $delta_4$. Similarly, the center example shows three positions being mapped, with two changes in fuel quantities measured therebetween and represented by $delta_5$ and $delta_6$.

Figure 2A:
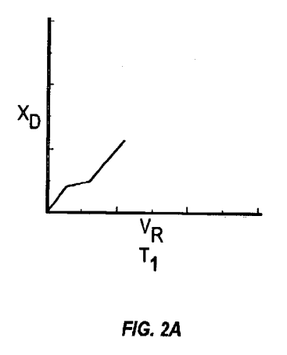
FIG. 2 shows examples of historically-based tank volume maps capable of being developed according to the teachings of the present invention.
Figure 2B:
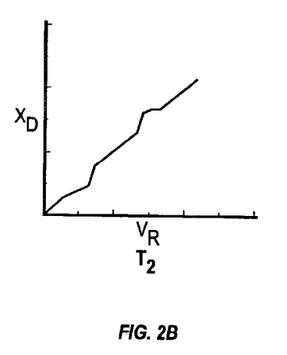
Figure 2C:
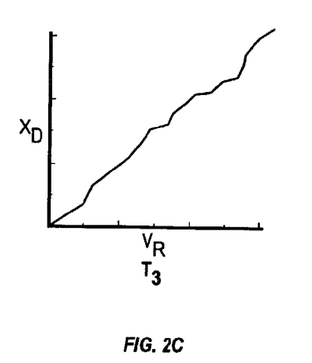

Fuel refilling is detectable and therefore a series of measured deltas can be initiated after every refueling process. Referring to FIGS. 2A–2C, it is illustrated that many iterations ($T_1$, $T_2$, $T_3$) of this filling and marking procedure will occur in the course of mapping the tank of fluid surface position ($V_D$) versus remaining volume ($V_R$). It is possible that it will not be until after many such refilling and marking procedures that the entire tank is mapped, if ever. The reason for this is that a boat operator, by nature, wants to avoid running the fuel tank completely empty for many reasons. Therefore, the lower portion of the tank will almost certainly be mapped less frequently than the top portion which correlates to that volume of the tank from which fuel is regularly used and refilled. Eventually though, a substantially continuous mapping of remaining fuel quantity ($V_R$) versus top-surface position ($V_D$) will be developed at, or accessible by, the processor. It is in this way that a "map" of the tank's 35 volume can generated. Alternatively, a map depicting such a relationship could be provided, but it is this "learned," or historically based type of map that is particularly preferred.

As described hereinabove, a particularly advantageous aspect of the present invention is its characteristic of continually refining the mapped relationship between fluid surface position ($V_D$) and remaining volume ($V_R$). As more refillings occur and are mapped, the more completely that "line" defining the relationship will be filled in. Still further, as many data points are collected along this line, statistical and mathematical manipulation becomes possible. In this way, a "virtual" line-of-relationship can be developed which can be used for producing readings to operators of such things as remaining fuel in a mapped fuel tank.

Figure 4:
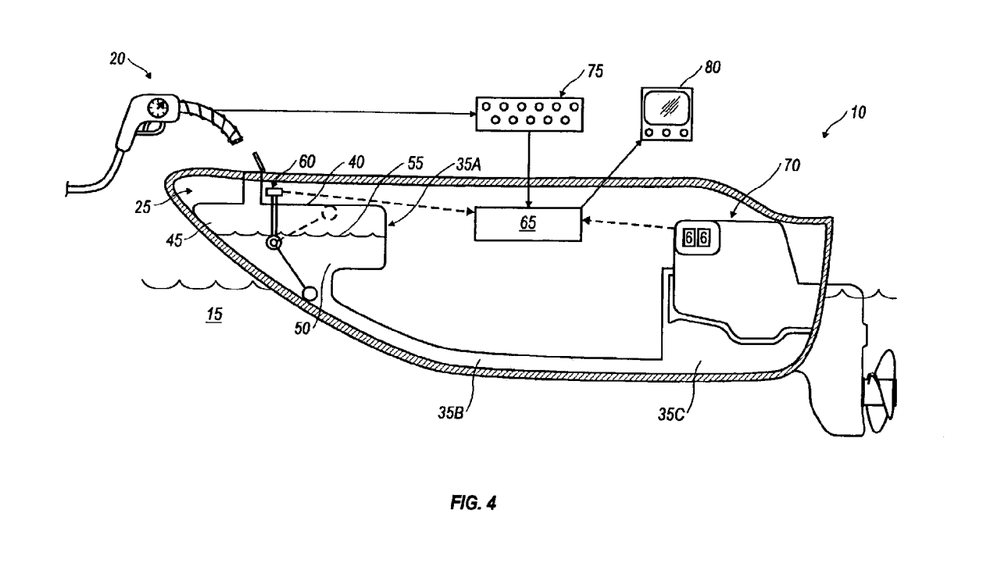
FIG. 4 is a schematic representation of an alternative arrangement configured according to one embodiment of the present invention in which effectively, a plurality of same-fluid containing tanks are located about the interior of the boat.

Referring to FIG. 4, an alternative embodiment of the invention is represented therein. Here, several different tank volumes 35A, 35B and 35C are shown located onboard and about the boat. In the illustrated configuration, the three tank volumes 35A, 35B and 35C are in fluid communication, one with the others. It is well known that space utilization onboard marine vessels is a priority, therefore it is not unusual for tanks of varying sizes and volumes to be located about the boat in a manner similar to that shown in FIG. 4.

Still further, it is also known to include a lower-elevation tank such as tank volume 35C that is typically going to be the last to be emptied. This is of particular importance with fuel tanks for diesel engines because intaking air instead of fuel can cause time consuming procedures to rid the engine of such air before operation can be resumed. It is also not unusual for only one tank volume of such a system to be capable of accommodating a sensor 60. As in the illustration, the sensor 60 is normally positioned in the larger, higher elevation tank. This means that it is substantially impossible to monitor the fill conditions of a large portion 35B and 35C of the total tank volume 35A, 35B and 35C in such an arrangement. As such, the present invention is particularly useful for mapping these volumes 35B and 35C that can not otherwise be monitored and reported upon; i.e.; fill-characteristics displayed to the operator.

The benefit of such mapping is easily appreciated, especially with respect to tanks configured as tank volume 35B. In this instance, the volume can be seen as having a great horizontal cross-sectional component (large area), but a relatively shallow depth. Because the operational range of any surface detector would be minimal in such an area, small changes in depth which may be difficult to register can have significant changes in volume associated therewith. As such, a sensor's accuracy would be significantly limited, while the mapping system disclosed herein would be insensitive thereto, and operate as accurately and efficiently as in any other tank volume.

It is also contemplated that the tank volumes 35A, 35B and 35C could be separate tanks that are not fluidly communicated. In that event, provided each is similarly configured so that amounts withdrawn from particular tanks can be so identified, their volumes can also be mapped. As described hereinabove, via the processor, the separate tanks can be represented as a single volume for ease in operator interpretation.

In practice, the invention can be operated as follows: it, is appreciated there are better and worse times for taking surface readings of the contained fluid 55. As described above, the worse times are when the fluid is turbulently splashing about in the tank, or the "attitude" of the tank is significantly offset from a specified frame of reference. For instance, an assumed orientation of the boat represented by the mapped aspects of fluid surface position ($V_D$) and remaining volume ($V_R$) can be that in which a long axis of the boat is horizontal. Turbulent tank conditions corresponding to times when fluid surface detections should be avoided are detectible in a plurality of ways. For instance, widely and rapidly varying surface readings would provide such an indication. Such conditions inside the tank may, however, be determined more indirectly. For instance, time at rest could be measured, and surface readings only taken after a predefined period of at-rest has elapsed. Similar criteria can be established for detecting substantially steady state travel when turbulence in the tank of interest should also minimized. In this case, however, the widely variable attitude of the vessel can be detected and a correction made back to the predetermined frame of reference.

During operation and display of a "fuel remaining" indication to the operator, surface readings are limited to when appropriate conditions exist. Therefore, direct readings from the map will only be possible at these intermittent times of existing appropriate conditions. In the times between, however, highly accurate "projections" can be made based on the last-made, surface detection based reading, with a subtraction for the fuel that has been consumed in the elapsed time period. When appropriate conditions exist again, a new bench-mark or calibrating surface detection or reading will be taken and the process repeated. In this way, the map is continually being refined. Each time that a such an iteration takes place, a tank volume has been learned between those two points which may have never been previously marked. Therefore, throughout the life of the system's data collection, "knowledge" about the tank's interior volume is continually improved.

It should be appreciated that the system will almost always be able to determine when fuel has been added to the tank has occurred; a positive, instead of negative volume change will be sensed from the last detection. Because refueling of most boats takes place at rest (a condition that can be reliably detected and verified, if desired), an optional feature is to enable the operator to input to the system how much fuel has been added. The system can then consider this in a corrective, calibrating and/or improving nature to the system because a measured volume can now be attributed to that portion of the tank which the system defines between the two detected top surface positions corresponding to before and after fueling.

As those persons skilled in these arts will appreciate, the disclosed system provides a boat operator better ways to obtain information about how much fluid remains in a particular tank of interest. In this vein, the invention is not limited to the embodiments shown, but can be varied in a number of different ways, for instance by combination of two or more of the different aspects that are described, without departing from the scope of the appended claims, and the arrangement and the method can be implemented in a number of ways depending on application, functional units, needs, requirements and the like.

What is claimed is:

1. A method for accommodating indirect ascertainment of fill-characteristics of fluid tanks on marine vessels, the method comprising the steps of:
   providing an experientially-based mapping of volume characteristics of a fluid tank positioned on a marine vessel correlated with respect to measurable fluid surface positions within the fluid tank;
   outputting fluid fill condition information for operator use based on quantification of a parameter other than sensed fluid level in the fluid tank based on a function of that other parameter being compared to the experientially-based mapping of volume;
   calibrating the accuracy of the output of fluid fill condition information by occasional adjustment of the map of volume characteristics versus measured fluid surface position; and
   assuring accuracy of the calibration by limiting execution of the calibration process to only when at least one of the following conditions is occurring: (a) the vessel is at a standstill, (b) the attitude of the vessel is substantially constant, and (c) fluid in the fluid tank is substantially static.

2. The method as recited in claim 1 wherein execution of the calibration process is limited to time periods when the vessel is at a standstill.

3. The method as recited in claim 1, wherein execution of the calibration process is limited to travel periods when the attitude of the vessel is substantially constant.

4. The method as recited in claim 1, wherein execution of the calibration process is limited to periods when fluid in the fluid tank is substantially static.

5. The method as recited in claim 4, further comprising: considering vessel attitude when performing the calibration process.

6. A method for accommodating indirect ascertainment of fill-characteristics of fluid tanks on marine vessels, the method comprising the steps of:
   mapping volume characteristics, that have been obtained oil an experiential basis, of a fluid tank positioned on a marine vessel; and
   outputting fluid fill condition information for operator use based on quantification of a parameter other than sensed fluid level in the fluid tank based on a function of that other parameter being compared to the experientially-based mapping of volume;
   calibrating the accuracy of the output of fluid fill condition information by occasional adjustment of the map of volume characteristics versus measured fluid surface position; and
   assuring accuracy of the calibration by limiting execution of the calibration process to only when at least one of the following conditions is occurring: (a) the vessel is at a standstill, (b) the attitude of the vessel is substantially constant, and (c) fluid in the fluid tank is substantially static.

7. The method as recited in claim 6, further comprising: correlating the volume characteristics versus sensable fluid surface level positions within the fuel tank and thereby enabling corrective calibration of the output of fluid fill condition information to the operator.

8. The method as recited in claim 7, further comprising: causing corrective calibration of the output of fluid fill condition information to automatically occur at preselected intervals.

9. The method as recited in claim 7, further comprising: requiring corrective calibration of the output of fluid fill condition information to be operator initiated.

10. The method as recited in claim 6, further comprising: basing the experientially based mapping of volume characteristics of the fluid tank on a known fluid volume contained within the fluid tank and a correlating sensed fluid surface level position within the fuel tank.

11. The method as recited in claim 10 further comprising: sensing the fluid surface level position within the fuel tank utilizing a mechanically-based detector.

12. The method as recited in claim 10, further comprising: sensing the fluid surface level position within the fuel tank utilizing a wave-based detector.

13. The method as recited in claim 12, further comprising: utilizing a wave-based detector that optically senses the fluid surface level position within the fuel tank.

14. The method as recited in claim 12, further comprising: utilizing a wave-based detector that utilizes sound waves to sense the fluid surface level position within the fuel tank.

15. The method as recited in claim 6, further comprising:
utilizing fluid consumption as the parameter upon which the outputting of fluid fill condition information is based.

16. The method as recited in claim 15, further comprising:
measuring fuel consumed thereby enabling operator readings of remaining fuel quantity in an on-board fuel tank.

17. The method as recited in claim 15, further comprising:
measuring water consumed thereby enabling operator ascertainments of remaining water quantity contained within an on-board water tank.

18. A calibrating liquid-level measurement arrangement for a marine vessel comprising:
a liquid storage tank positioned on a marine vessel;
a liquid surface position sensing device in communication with a processor and adapted to provide position-indicating data regarding a sensed position of a liquid surface in said liquid storage tank to said processor;
an operator input to said processor adapted to accept quantitative information regarding liquid amounts added to said liquid storage tank;
a liquid withdrawal arrangement in fluid communication with said liquid storage tank, said liquid withdrawal arrangement having a capability for measuring a volumetric amount of liquid withdrawn from said liquid storage tank via said liquid withdrawal arrangement; and
said processor adapted to compare the sensed position of the liquid surface in said liquid storage tank with the measured volumetric amount withdrawn from said tank thereby enabling correlation between an amount of liquid stored in said liquid storage tank and a corresponding sensed position by said liquid surface position sensing device.

19. A method for calibrating a liquid-level measurement arrangement for a marine vessel comprising:
sensing an initial position of a liquid surface in a marine vessel's liquid storage tank that is at least partially filled with an amount of liquid;
measuring an amount of liquid withdrawn from said liquid storage tank and sensing a subsequent position of the liquid surface in said liquid storage tank thereby enabling an assignment of the volume of liquid stored in said liquid storage tank defined between said initial and subsequent positions, execution of said step of sensing a subsequent position of the liquid surface being limit to only when at least one of the following conditions is occurring: (a) the vessel is at a standstill, (b) the attitude of the vessel is substantially constant, and (c) fluid in the fluid tank is substantially static; and
repeating a series of such sensing and measuring steps thereby enabling a mapping of stored liquid volume inside said liquid storage tank with respect to an axis defined by a series of detectable liquid top surface position
quantifying an amount of liquid added to a liquid storage tank positioned on a marine vessel; and
correlating said quantified amount of liquid added to said liquid storage tank with a map-derived amount using sensed positions of the liquid surface in said liquid storage tank before and after the addition of said quantified amount of liquid.

20. The method as recited in claim 19, further comprising:
utilizing, in a following sensing and measuring step, said subsequent sensed position as an initial sensed position of the liquid top surface thereby enabling a substantially continuous mapping of stored liquid volume inside said liquid storage tank.

21. The method as recited in claim 19, further comprising:
correcting said map-derived amount to said quantified amount thereby calibrating the mapping of stored liquid volume inside said liquid storage tank.

22. The method as recited in claim 19, further comprising:
initializing said mapping of stored liquid volume inside said liquid storage tank with respect to said axis along which said liquid surface positions are taken sensing an initial position corresponding to an essentially empty tank having substantially no liquid surface therein;
filling, to a substantial extent, said liquid storage tank with a measured mount of liquid; and
sensing a subsequent position of the liquid surface in said substantially full liquid storage tank and thereby enabling an assignment of a substantial total volume of said liquid storage tank defined between liquid surface positions corresponding to essentially empty and substantially full tank conditions.

23. The method as recited in claim 19, further comprising:
enabling accurate readings of tank contained volumes based on liquid surface position along said axis based on an historically-based and calibrated mapping of tank volume with respect to axis position of sensed liquid surface position therealong.

24. The method as recited in claim 19, further comprising:
enabling the utilization of non-uniformly shaped tanks with respect to said axis along which said liquid surface positions are taken.

25. The method as recited in claim 19, further comprising:
enabling the utilization of non-uniformly shaped tanks with respect to said axis along which said liquid surface positions are taken and non-matched liquid surface position sensors thereby increasing the universality of a pre-configured liquid storage tank arrangement positioned on a marine vessel.

26. The method as recited in claim 25, further comprising:
enabling the utilization of non-rigid liquid storage tanks that are influenced in shape, at least partially, by the environment in which said tanks are placed for operation.

27. The method as recited in claim 19, further comprising:
causing the sensing of the liquid surface positions in the marine vessel's liquid storage tank to preferentially be taken when the marine vessel has been traveling at a substantially constant speed for a predetermined period of time.

28. The method as recited in claim 19, further comprising:
causing the sensing of the liquid surface positions in the marine vessel's liquid storage tank to only be taken when travel conditions of the marine vessel have satisfied a predetermined criteria.

29. The method as recited in claim 19, further comprising:
permitting the sensing of liquid surface positions in the marine vessel's liquid storage tank only when travel conditions of the marine vessel have satisfied a predetermined criteria.

30. The method as recited in claim 19, further comprising:
permitting the sensing of liquid surface positions in the marine vessel's liquid storage tank preferentially when the marine vessel is stopped.

31. The method as recited in claim 19, further comprising:
permitting the sensing of liquid surface positions in the marine vessel's liquid storage tank preferentially when a longitudinal axis of the marine vessel is off-set no more than a predetermined amount from horizontal.

32. The method as recited in claim 19, further comprising:
permitting the sensing of liquid surface positions in the marine vessel's liquid storage tank preferentially when a longitudinal axis of the marine vessel is off-set no more than a predetermined amount from a static floating inclination of the marine vessel.

33. The method as recited in claim 19, further comprising:
configuring the liquid storage tank on the marine vessel as a fuel tank for a propulsion system of the vessel.

34. The method as recited in claim 33, further comprising:
permitting non-measured draws on the fuel tank containing liquid storage tank for consumption other than by propulsion systems of the vessel.

35. The method as recited in claim 34, further comprising:
blending out the effects of consumption by non-measured draws from the fuel tank on mapped tank volumes corresponding to liquid surfaced positions sensed along said axis.

36. The method as recited in claim 19, further comprising:
displaying a mapped amount of liquid remaining in said tank in a conventional manner thereby avoiding confusion by an observing operator.

37. The calibrating liquid-level measurement arrangement for a marine vessel as recited in claim 18, wherein said processor is further adapted to control said liquid surface position sensing device to output position-indicating data regarding a sensed position of the liquid surface in said liquid storage tank only when at least one of the following conditions is occurring: (a) the vessel is at a standstill, (b) the attitude of the vessel is substantially constant, and (c) fluid in the fluid tank is substantially static.

* * * * *